United States Patent [19]
Barr et al.

[11] Patent Number: 5,909,334
[45] Date of Patent: Jun. 1, 1999

[54] VERIFYING WRITE OPERATIONS IN A MAGNETIC DISK DRIVE

[75] Inventors: Lawrence J. Barr; Anil Sareen, both of Mission Viejo, Calif.

[73] Assignee: Western Digital Corporation, Irvine, Calif.

[21] Appl. No.: 08/644,507

[22] Filed: May 10, 1996

[51] Int. Cl.[6] .................................................. G11B 5/09
[52] U.S. Cl. ................... 360/53; 360/54; 360/31
[58] Field of Search ............................ 360/53, 31, 54; 395/837

[56] References Cited

U.S. PATENT DOCUMENTS

| | | | |
|---|---|---|---|
| 5,157,670 | 10/1992 | Kowal | 360/53 X |
| 5,184,341 | 2/1993 | Hamasaka et al. | 360/54 |
| 5,241,546 | 8/1993 | Peterson et al. | 371/37.1 |
| 5,267,100 | 11/1993 | Ichijo | 360/53 |
| 5,406,540 | 4/1995 | Longman et al. | 369/116 |
| 5,469,418 | 11/1995 | Satoh et al. | 369/54 |
| 5,471,351 | 11/1995 | Ishiguro | 360/53 |

Primary Examiner—Aristotelis M. Psitos
Assistant Examiner—Alan Faber
Attorney, Agent, or Firm—Leo J. Young, Esq.; Milad G. Shara, Esq.

[57] ABSTRACT

A method and apparatus for verifying that data written on magnetic disk media can be successfully recovered in subsequent read operations and ensuring that the data to be written is held by a buffer until a read-verify operation indicates that the buffer space storing the data may be relinquished for new operations.

3 Claims, 11 Drawing Sheets

VERIFYING WRITE OPERATIONS IN A MAGNETIC DISK DRIVE

FIELD OF THE INVENTION

The invention relates to magnetic hard disk drives used for storage and retrieval of data in computer systems. More particularly, the invention relates to methods and apparatus for verifying that data written on the disk can be reliably recovered during subsequent read operations.

BACKGROUND OF THE INVENTION

The desirable goal of increasing the areal recording density of magnetic disk drives frequently can be obtained only with an undesirable side effect, i.e., increased raw error rate. For example, increased areal recording density can frequently be obtained by reducing the distance between the recording head and the media surface during periods of data transfer. This distance is known in the art as the "flying height." Reducing the flying height increases the susceptibility to errors due to media surface defects or debris that can cause the head to momentarily alter its flight profile. If this occurs during a write operation—known as a "high-fly write"—the resulting data written on the media can, during a subsequent read operation, exhibit errors exceeding the correction capability of the drive electronics or can be written with such marginality that the reliability of subsequent reads of the data is unpredictable. These transient errors can significantly impact the performance of the disk drive.

Historically, the design of magnetic disk drives has focused on improvements in read signal processing to optimize the capture and correction of data recovered from the media, without evaluation of the data originally written. There are limits to the ability of read electronics to recover marginal data, including the length of error correction codewords on the media which subtracts from the area available for user data; the dynamic range of channel electronics; and the tolerance of decoding schemes such as PRML to erroneous data. These limits are challenged by the inexorable march towards higher areal density and increasing demands for reliability in the face of severe price competition.

Although disk drives provide for post processing or "heroic recovery" of data stored in the disk drive buffer by the drive microprocessor, performance is degraded in these instances due to computing cycles which must be executed by the microprocessor and the need to occupy the limited buffer space available in the drive.

In other types of storage peripherals the verification of data written to the media, at the storage device level, has been limited to magnetic tape systems and optical disk drives. Magnetic tape practitioners have dealt with the problem of imperfect writes with a head/media structure having separate read and write heads with the read head positioned downstream of the write head. This allows the data written on the media to be verified simultaneously with the write operation.

Optical disk drives, being used primarily for archival or read-only applications, have provided data integrity checks that compare buffered host data with data read from the media. This was done because the writing process was known to be error prone and not a factor in performance, since only the time required for read operations is perceived by the user in most instances. For example in U.S. Pat. No. 5,471,351, Ishiguro discloses a method for verifying data being written by writing the data, then comparing data read from the media to the buffered data to be written, counting errors, then comparing those errors to the number of errors recorded from an ECC error correction on the same data. This method imposes a heavy processing load on the disk microprocessor as well as requiring additional storage space for the data read from the media.

In U.S. Pat. No. 5,469,418, Satoh et al disclose a dual head system for verification of data read from the media, a costly structure not compatible with the cost constraints of a competitive magnetic disk drive. A comparable approach, suitable only to optical drives, is disclosed in U.S. Pat. No. 5,406,540 by Longman et al, who use a photodiode as a read element.

In U.S. Pat. No. 5,184,341, Hamasaka et al disclose a method for successively writing and verifying data in an optical disk drive that performs verification by reading and processing previously written data including the detection of uncorrectable errors. However Hamaska et al teach that the recorded data to be verified is stored in a buffer memory and do not suggest the use of on-the-fly error correction techniques.

The existing art in the field of storage peripherals therefore does not suggest how to satisfy the requirements of verifying written data within a magnetic disk drive without significant use of the limited buffer space provided for data storage and while minimizing the processing load on the disk drive microprocessor.

SUMMARY OF THE INVENTION

The invention provides a method of operating a disk drive connected to a host computer, the drive including a rotating magnetic disk and a buffer memory. The method includes the steps of receiving a block of data from the host computer and storing the block of data in the buffer memory as it is being received. While the block of data remains in the buffer memory the drive writes a copy of the block of data to the disk including redundancy data. The drive then automatically reads the block of data and the redundancy data from the disk while suppressing transfer of the data to the buffer memory. The drive tests the data block read from the disk to determine if the data is within correctable limits.

Testing of the data is preferably performed using on-the-fly error correction. Additionally, if the data is outside correctable limits, the data is preferably re-written until it is within correctable limits or until a predetermined count limit is reached. The preferred embodiment further relocates the data block to a spare area of the disk if the limit of re-writes is reached. In another aspect of the invention, the readverify method includes the step of spanning the error location to insure that areas which may have been marginally written are re-written to restore data integrity.

In another aspect of the invention, the read-verify operation includes the step of marking the portion of buffer memory used to store the host data block until the data has been written and verified.

The invention also includes an apparatus for verifying that data written on the disk media is within correctable limits and re-writing the data until the data is correctable without using a buffer to store data read from the media.

DETAILED DESCRIPTION OF A PREFERRED EMBODIMENT

Disk Drive Overview

Figure 1:
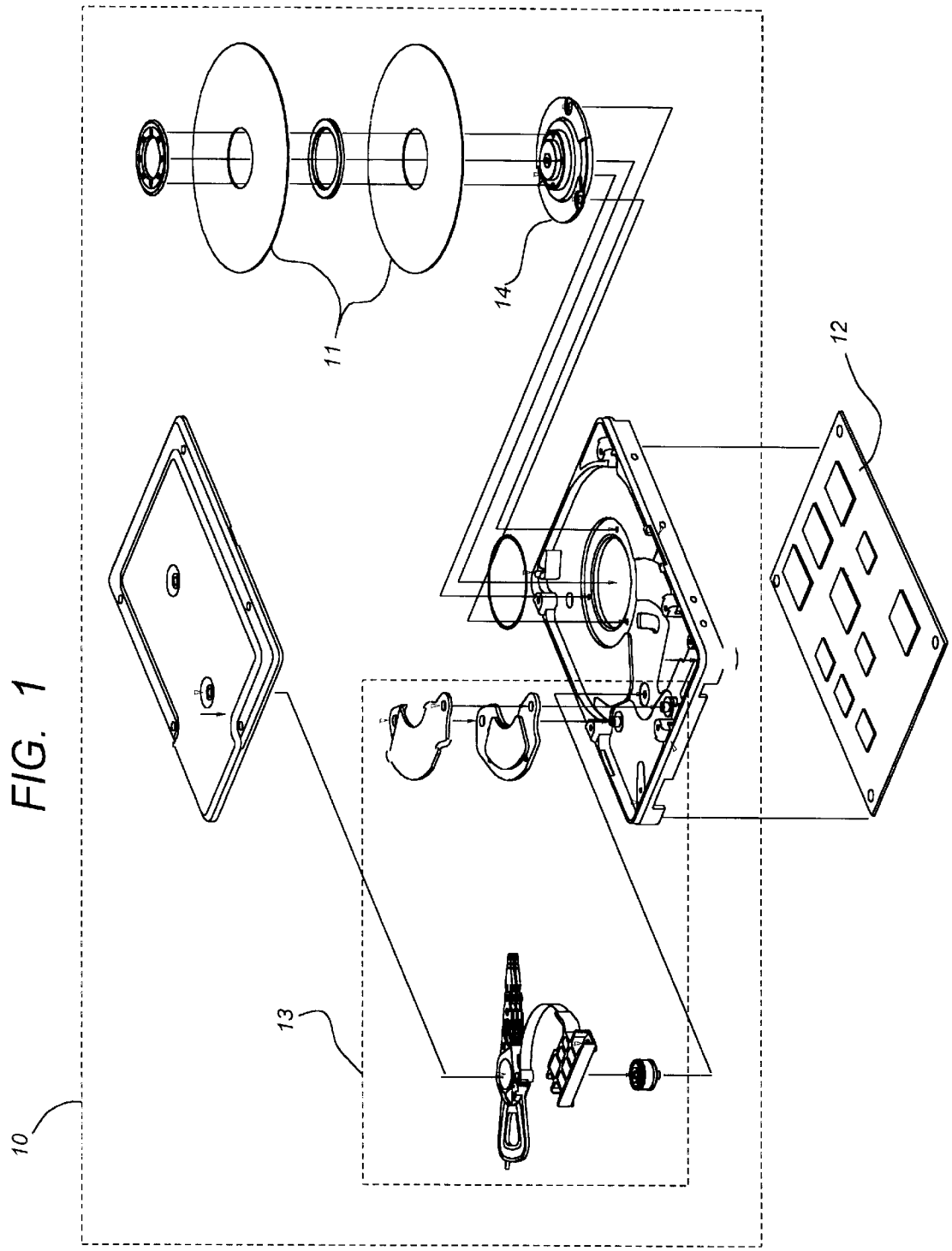
FIG. 1 is an exploded view of a magnetic disk drive with HDA and controller assembly employing this invention.

FIG. 1 is an exploded view of a magnetic disk drive using the method claimed in the invention. The drive includes an HDA 10 and a controller assembly 12. HDA 10 includes magnetic disk media 11 having surfaces prepared for the recording and recovery of data transferred to and from a host computer (not shown.) The surfaces include pre-recorded embedded servo sectors used to locate and identify concentric tracks and data sectors within the tracks. HDA 10 also includes an actuator assembly 13 providing a mechanism for radially moving read/write heads across the disk media surface, and includes a spindle motor assembly 14 for rotating the disk media. Controller assembly 12 is connected to the HDA and includes a printed circuit board and electronic circuits used to control the disk drive and provide an interface to the host computer.

Controller Block Diagram Description

Figure 2:
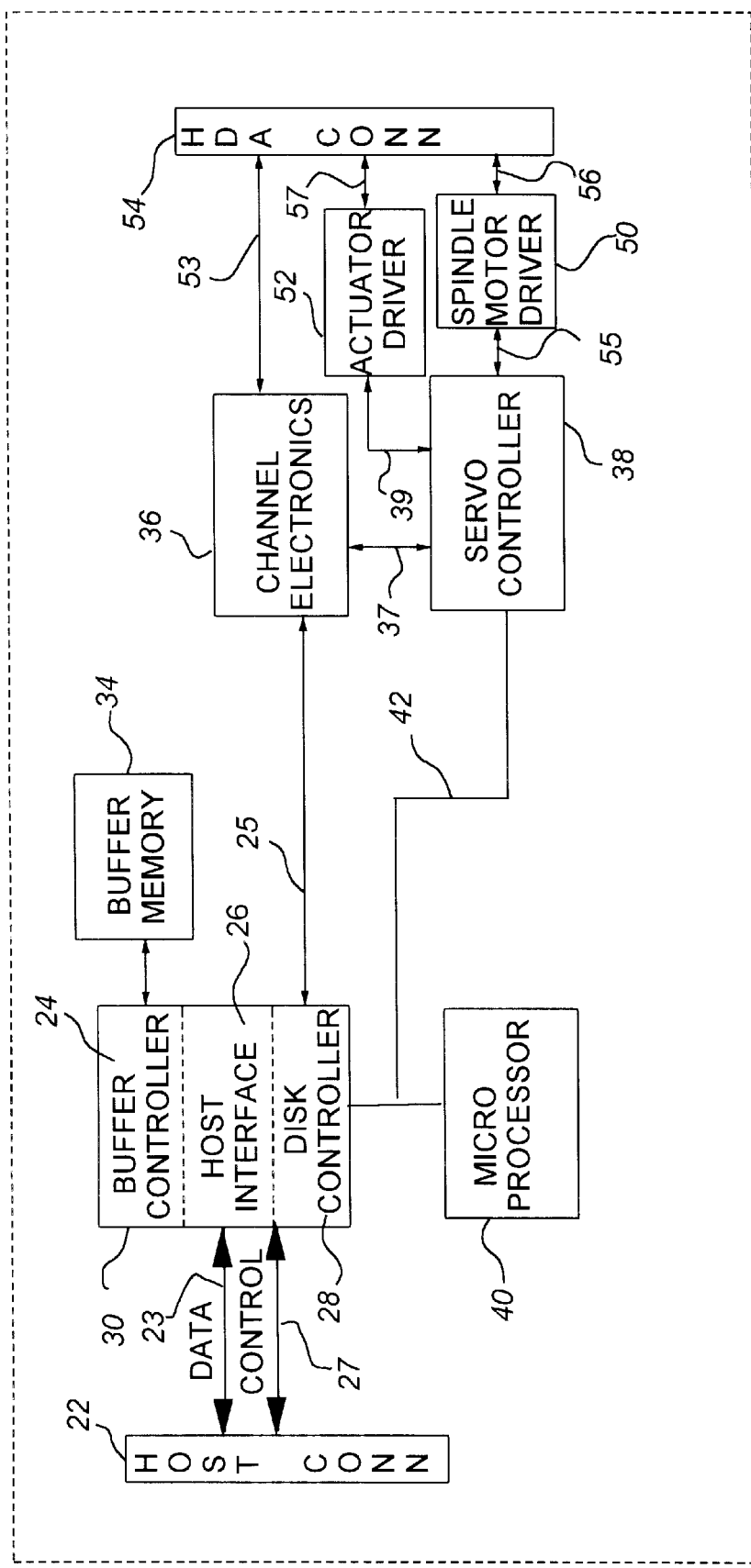
FIG. 2 is a block diagram of the controller assembly electronics of this invention.

FIG. 2 is a block diagram of the major electronic components in one embodiment of a disk drive employing the invention. Alternate embodiments of the controller electronic components may separate or combine the functional blocks in a manner different from that shown without departing from the spirit of the invention.

Controller assembly 12 includes a host connector 22, an integrated circuit controller 30, a buffer memory 34, channel electronics 36, a servo controller 38, a microprocessor 40, a spindle motor driver 50, an actuator driver 52, an HDA connector 54, and various signal paths. The signal paths include a data signal path 23 and control signal path 27 defined between host connector 22 and integrated circuit controller 30; a signal path 25 defined between integrated circuit controller 30 and channel electronics 36; a signal path 37 defined between channel electronics 36 and servo controller 38; a signal path 39 defined between servo controller 38 and actuator driver 52; a signal path 57 defined between actuator driver 52 and HDA connector 54; a signal path 55 defined between servo controller 38 and spindle motor driver 50; a signal path 56 defined between spindle motor driver and HDA connector 54; a signal path 53 defined between channel electronics 36 and HDA connector 54, and a bus 42 defined between microprocessor 40 and both controller 30 and servo controller 38.

Host connector 22 provides for electrically connecting the drive to the host computer (not shown), and HDA connector 54 electrically connects controller assembly12 to HDA 10. Integrated circuit controller 30 includes three functional blocks: a buffer controller 24, a host interface controller 26, and a disk controller 28.

Buffer controller 24 is connected to buffer memory 34, which may be implemented as a static random access memory (SRAM) or dynamic RAM (DRAM) in various forms including fast-page mode, extended data out (EDO) or the like. Buffer memory 34 may be a single device; an array of devices; or in an alternate embodiment, a memory cell array integrated within the buffer controller. Buffer controller 24 operates to provide a data path and control signals for reading and writing data in the buffer memory 34. Data stored in buffer memory 34 may be received from the host computer during a host write operation, or may be received from the disk media 11 during a disk read operation.

Host interface controller 26 provides a path and logic for data and control signals associated with a host bus (not shown), attached to the host computer. Host interface controller 26 also performs command decoding and status presentation functions. In the preferred embodiment, the host bus is implemented as the ATA attachment prevalent in the personal computer industry. Other useful implementations include the SCSI bus and the SSA serial bus architecture. Host interface controller 26 communicates with microprocessor 40 to signal the receipt of host commands, and transfers data between the host bus and buffer memory 34 in cooperation with buffer controller 24.

Disk controller 28 provides control logic for encoding and decoding data written to and read from the disk media. The data read from the disk includes position information such as track and sector identification fields, as well as user data. Disk controller 28 also includes error detection code (EDC) and error correction code (ECC) logic, shown in FIG. 3 and later discussed, which provides means for calculating and appending redundancy codes to each block of data written to the disk and for detecting and correcting errors in the recorded block during read operations.

Microprocessor 40 commands disk controller 28 to perform operations through bus 42. Commands and parameters for disk read and write operations are loaded into registers used during command execution. In addition to disk read commands, which process data from the disk media received from channel electronics 36 and transfer the data into buffer memory 34 through buffer controller 24, a Read-Verify command is implemented in disk controller 28. This command causes data to be passed through all normal decoding and error correction circuits in disk controller 28, providing a signal when error bursts are greater than the span of the on-the-fly error correction system. The Read-Verify command differs from the normal Read command in that no data is transferred to buffer memory 34 to execute the ReadVerify command. This provides a beneficial diagnostic capability in that data errors can be characterized as to their correctability without using buffer memory space which is an essential component of disk drive performance. The Read command provides the same error diagnosis capability but uses buffer memory space during the operation.

Microprocessor 40 is a conventional stored program processor such as the Intel 80C196 that executes code from program memory (not shown). Program memory may be integrated within the microprocessor or implemented in an external readonly memory (ROM) or programmable readonly memory (PROM). The stored program executed by microprocessor 40 manages the resources represented by the controller components and the HDA to optimize performance and data transfer integrity within the disk drive. In particular, the method of the subject invention is practiced by the execution of a stored program. Although in the preferred embodiment a single microprocessor is shown, alternate embodiments may implement additional microprocessors such as needed for managing the servo control functions. This invention may be practiced with equal advantage in such alternative embodiments.

Servo controller 38 is connected to microprocessor 40 through bus 42 for command, data transfer and priority interrupt functions. Servo Controller 38 is connected to channel electronics 36 for receiving servo burst and ID field information when embedded servo fields, written on the media during the manufacturing process, are moving under the disk read heads. During disk seek operations when actuator assembly 13 of HDA 10 operates to reposition the read/write heads to a particular track on the disk media, servo controller 38 accepts seek parameters from microprocessor 40 and provides actuator driving signals on a control path through actuator driver 52 and HDA connector 54. Microprocessor 40 confirms completion of the seek operation by reading track identification data recorded in the embedded servo fields. Once the read/write heads are positioned on the specified track, servo controller 38 maintains the heads in position over the track by reading servo burst information recorded on the media, received through channel electronics 36, and responsively applying small increments of correction to the actuator position through the above-mentioned control path.

Servo controller 38 also contains control logic to drive disk spindle motor 14 at a precise revolution rate through spindle motor driver 50 and HDA connector 54. The precise rotation speed of the disk media enables channel electronics 36 to write and read data within predictable dynamic ranges.

Channel electronics 36 includes circuits which, in write operations, transform encoded digital data into analog signals for driving the head to write magnetic flux transitions onto the disk media. During read operations, circuits in channel electronics 36 reverse this process, transforming magnetic flux transitions detected by the head from the media surface into decoded digital data. Channel electronics 36 is connected to the read/write heads through internal head selection logic via HDA connector 54.

On-The-Fly ECC Description and Reference

As disk drive areal density has increased, the raw error rates of data read from the media has increased substantially. Fortunately, error detection and correction technology has enabled reliable disk drive systems to be manufactured despite the increased raw error rate since data can be corrected prior to presentation to the host computer. Generally, a data stream or block of data to be written on the disk is first passed through an error correction code generator that produces a set of check codes that are appended to the data block written on the disk. The concatenation of the data block and the check codes form a "codeword." When the disk reads the codeword, error detection code logic produces a set of "syndromes" which represent the result of a process which is complementary to the code generation process. Non-zero syndromes indicate an error in the recovered codeword and the syndromes provide information which is useful in determining the location and magnitude of the error.

Prior improvements in disk drive technology, termed "on-the-fly" error correction, provided methods and apparatus which enable error correction processing of a received codeword without interrupting the reading of a consecutive codeword. A recent implementation of an on-the-fly error correction system is described in U.S. Pat. No. 5,241,546 by Peterson et al, the disclosure of which is incorporated herein by reference.

Figure 3:
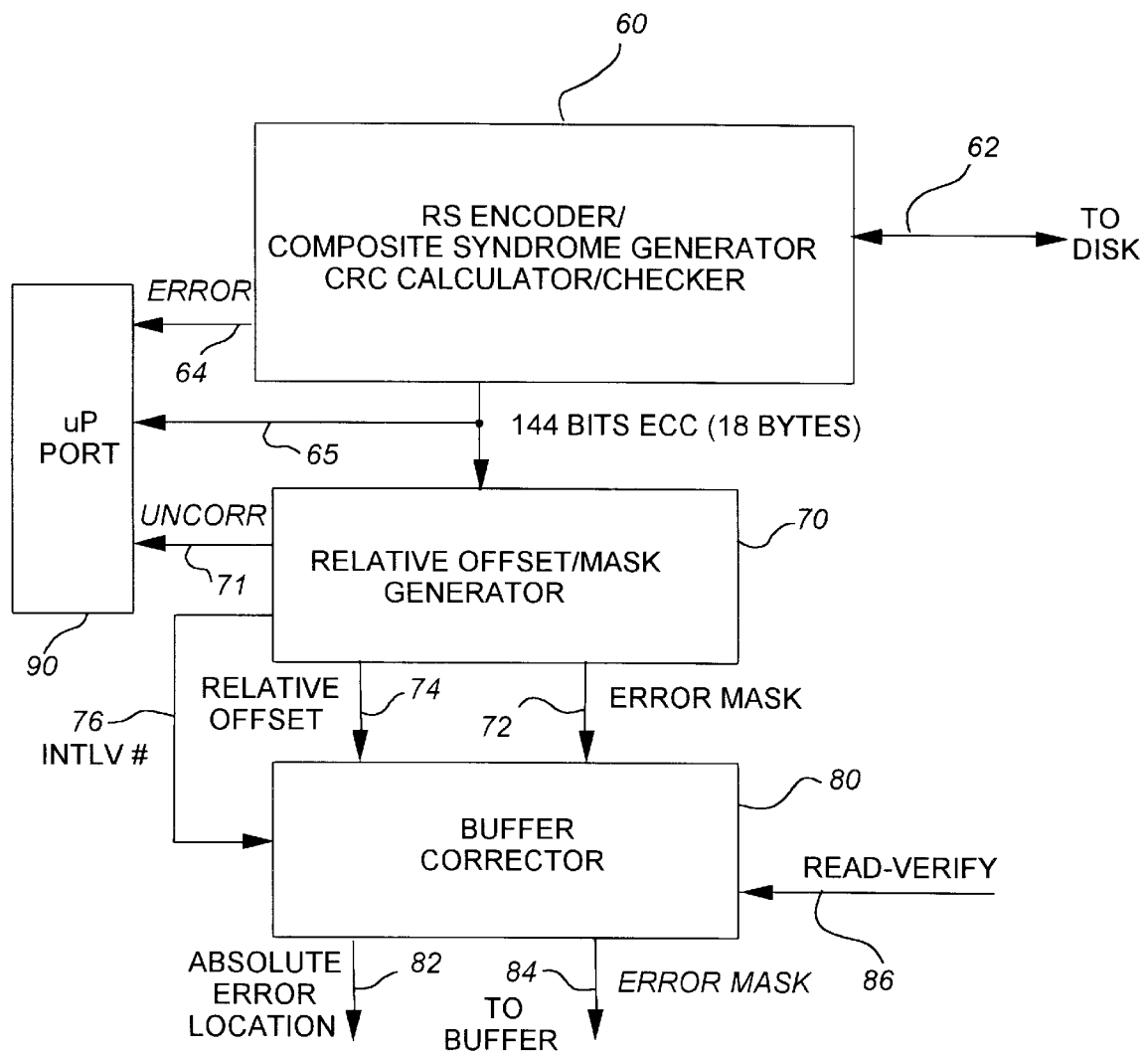
FIG. 3 is a block diagram of an error detection and correction portion of this invention.

Typically, error correction performed on-the-fly is limited in the extent or "span" of errors which can be corrected compared to the more extensive processing which could be performed with the disk drive microprocessor. Additionally a miscorrection in the process is a possibility. An improved error correction structure is disclosed in pending Application Ser. No. 08/436,515 entitled "Disk Drive with Embedded Finite Field Processor for Error Correction," assigned to the assignee of this invention, the specification of which is incorporated herein by reference. FIG. 3 is a block diagram of the improved structure which may be incorporated into disk controller 28. A Reed-Solomon (RS) Encoder/Syndrome Generator/CRC calculator checker 60 generates a sequence of 4 error detection code bytes, called a Cyclic Redundancy Check (CRC). The CRC bytes are appended to the user data block when written to the disk through line 62. The data block of 512 bytes and the concatenated 4 CRC bytes are passed through a Reed-Solomon encoding process which provides a set of 18 ECC bytes which are appended the data block and CRC during the write operation to form a complete codeword of 512+4+18=534 bytes.

RS Encoder 60 also provides for an interleaving of the error correction code generation such that three interleaves representing respective thirds of the data block, each having corresponding 6 byte ECC (18 ECC bytes total), are processed. This allows for a correction span of one byte in each interleave during read operations which significantly improves data recovery over a single byte error correction path.

During a read operation, a codeword—comprising sequentially data, CRC, and ECC—is read from the disk on line 62 and passed through a composite syndrome generator and CRC calculator/checker in block 60. If the result of the CRC check indicates an error to that point in the codeword, error line 64 is asserted and may be read by microprocessor 40 through uP port 90. The remainder of the codeword, comprising the ECC bytes, is passed through the composite syndrome generator in block 60 to form a set of 18 syndrome bytes. If the syndrome generation results in any non-zero syndrome bytes, an error is indicated through error line 64.

The detection of CRC errors provides an additional safeguard against miscorrections since the error control logic can validate the ECC syndrome generation by comparing the results of the CRC check against the syndrome generation. When there is both a CRC error and a non-zero syndrome, the likelihood of miscorrection is greatly reduced.

When an error is indicated, the syndrome bytes 65 are provided to Relative Offset/Mask Generator 70. When enabled, the logic in block 70 computes a buffer offset address 74 and error mask 72 from the syndrome bytes and provides the offset address 74, error mask 72 and interleave number 76 to Buffer Corrector 80. Buffer Corrector 80 then calculates an absolute buffer memory address 82 and corrects the data in buffer memory 34 through buffer controller 24 using error mask 84. During operation of a Read-Verify command, the buffer update process as well as the transfer of disk data to the buffer memory is inhibited by Read-Verify signal 86.

Because the entire correction process only requires the stored syndrome bytes and because the process can be completed before the next consecutive codeword is processed, the requirements of on-the-fly error correction are satisfied.

In some cases, when syndrome bytes 65 are processed by Relative Offset/Mask Generator 70, the errors in the recovered codeword may exceed the error correction span of the logic i.e. one byte per interleave. In this case, the correction of data in the buffer memory is suppressed and the Uncorrectable signal line 71 is asserted. The state of this signal may be read by microprocessor 40 through uP port 90. Microprocessor 40 may elect to attempt extended recovery of the data when Uncorrectable line 71 is asserted. Under these circumstances the transfer of data from the disk is terminated and microprocessor 40 reads the syndrome bytes 65 through uP port 90 for use in extended error correction.

High-Fly Write Phenomenon

Figure 8:
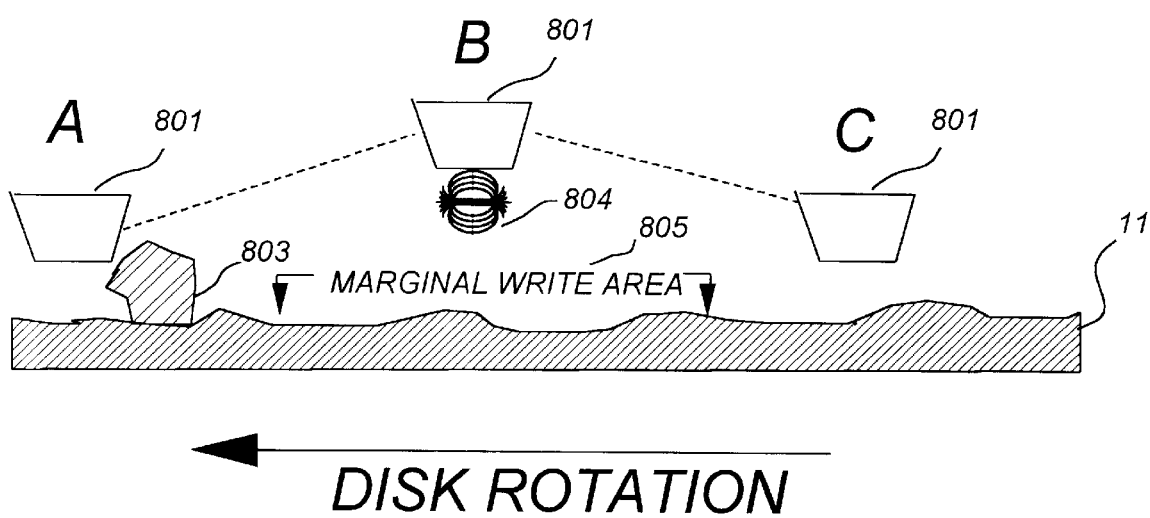
FIG. 8 is a pictorial representation of the "high fly write" phenomenon addressed by the invention.

The surface of disk media 11, although nominally uniform in profile, may contain small imperfections which can affect the integrity of magnetic recording on the surface. More importantly in the context of current technology requiring extremely low flying height profiles to achieve areal density improvements, small surface defects or debris can cause the recording head to momentarily alter its flight profile. FIG. 8 illustrates such a phenomenon. As disk media 11 rotates under head 801, at point A head 801 encounters debris 803 causing the profile to be raised along a line extending from point A to point B and subsequently returning to normal at point C. During this period of time magnetic field 804 is at a varied distance from disk media 11. If a disk write operation occurs during this period, known as a "high fly write," the data which is written may be marginally recoverable. This area is indicated by the marginal write area 805. The inventors have recognized that as the propensity for errors due to the high-fly write increases as flying heights decrease, a method for verifying that the write operation produces data which can be read within acceptable error limits will minimize the rate of transient errors and optimize disk drive reliability.

Block Terminology and Write, Read-verify Overview

The term "block" as used in the disk drive art applies broadly as a term for discrete and contiguous sequences of data. The block received from a host computer is normally 512 bytes in length, analogous to the nominal disk media sector user data length of 512 bytes. When disk drive firmware stages a sequence of such data blocks for writing to the disk media, the sequence is handled as a group and may be termed a "write block." Similarly during read or read-verify operations, a sequence of data sectors may be grouped and termed a "read block" or "read-verify block." These terming conventions will be used in this disclosure.

FIGS. 9a–9d provide an overview of the method of writing and subsequently verifying data while illustrating the usage of block terminology. The process starts at FIG. 9a when the host specifies a sequence of blocks 900 to be written to the disk drive. This sequence in the preferred embodiment may range from 1 to 256 blocks although alternative embodiments may provide for other block counts. The data is stored in the buffer 905 up to the capacity of the buffer. The status of the buffer at this point is shown in buffer status table 910 where data blocks 1 through n have been stored, although the host has indicated that blocks 1 through n+3 are to be written. The status of each block is indicated in the three columns respectively labeled "AVLBL" meaning that the buffer space for a host block is "available" or empty, "WRITTEN" meaning that the block has been written to the media, and "VERIFIED" meaning the block has been successfully written on the media. An "N" in a status column indicates a No or False condition, while a "Y" in the status column indicates a Yes or True condition. As indicated in buffer status table 910, all the buffer space allocated for host write blocks is occupied (not available), and the data has not been written or verified.

Figure 9A:
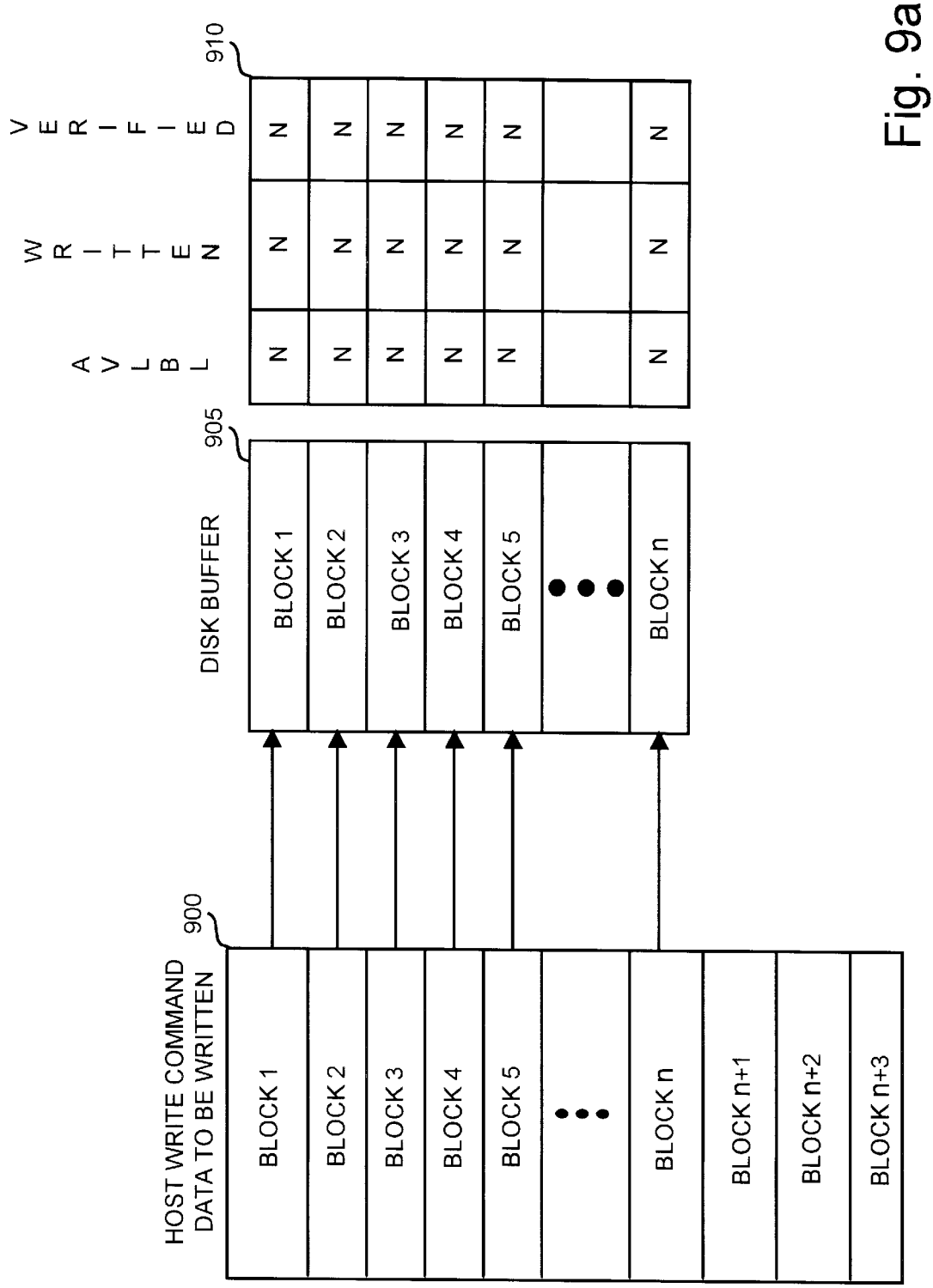
FIGS. 9a,9b,9c,9d illustrate the flow of data from the host to the disk buffer memory and the status of data in the buffer memory during operation of the write and read verify operations method of this invention.
Figure 9B:
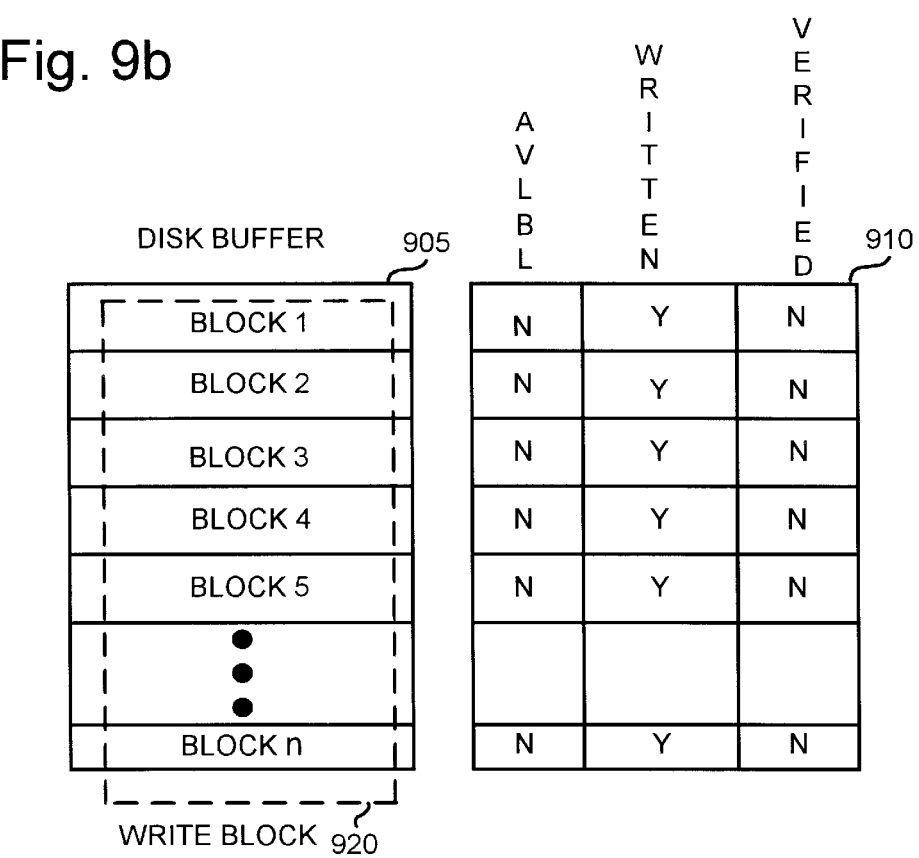

In FIG. 9b, the full usage of the disk buffer space 905 triggers an operation to write the data to the media in order to free up buffer space and complete the host write operation. A write block 920, comprising all the stored host data blocks, is written to the media and the buffer status table 910 is updated to reflect this fact.

Figure 9C:
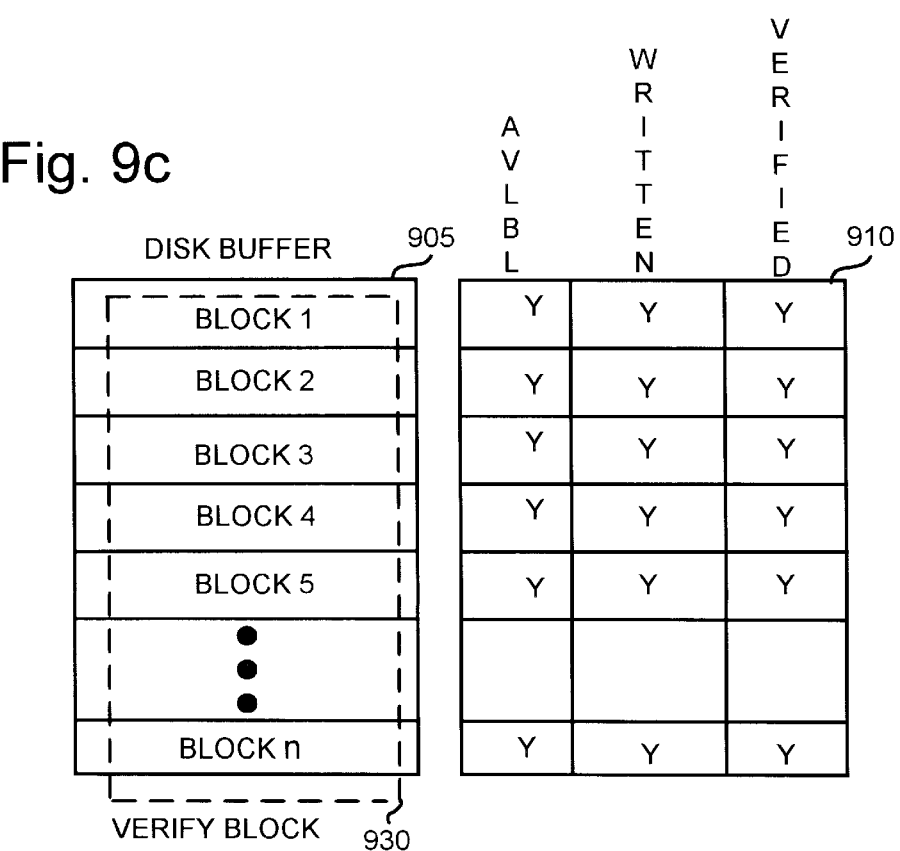

In FIG. 9c, after completing the writing of the block to the media, a read verify operation is initiated. The block to be verified 930 is checked using the Read-Verify command of disk controller 28 and the buffer status table 910 is updated.

Figure 9D:
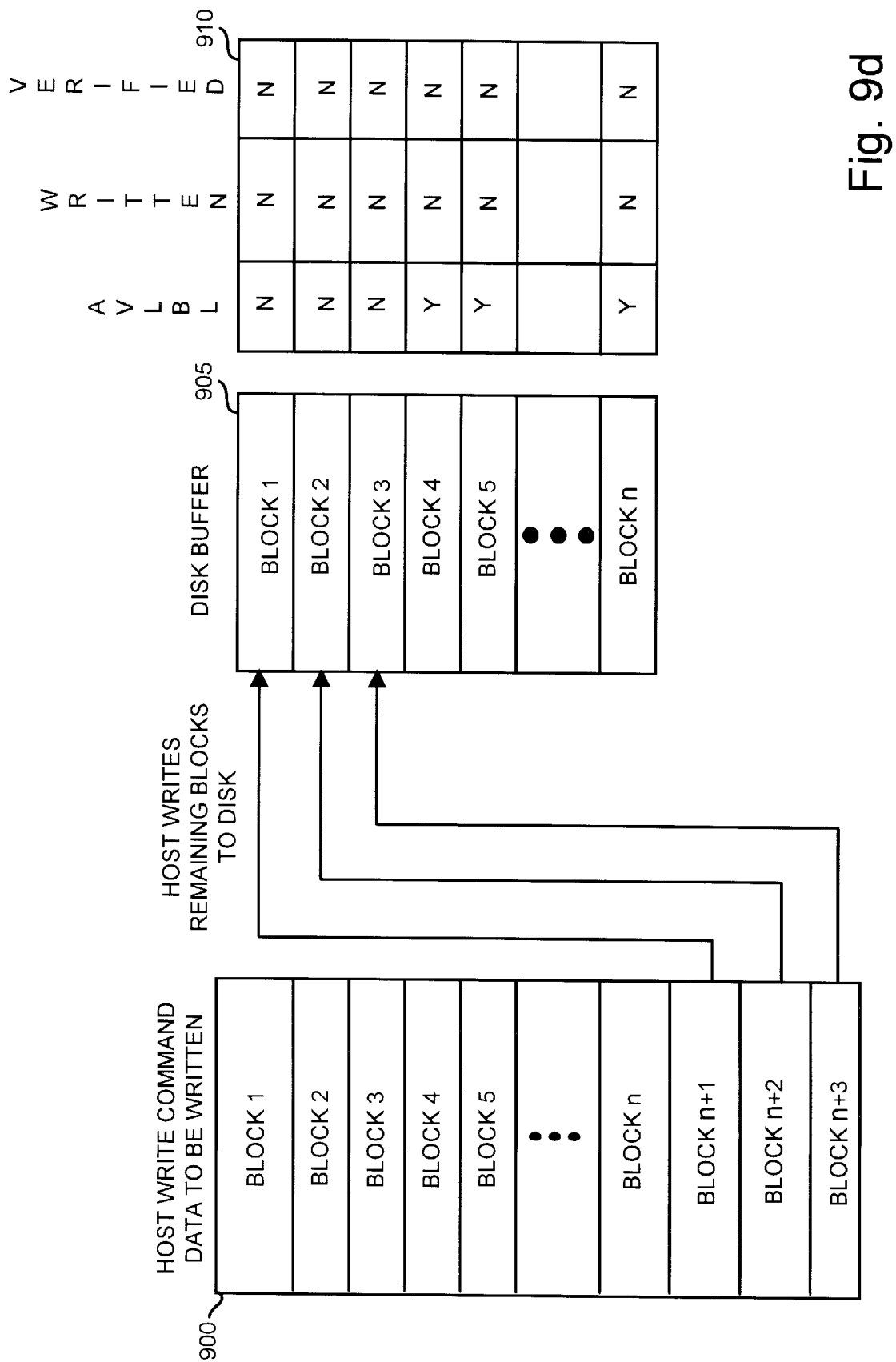

As shown in FIG. 9d, the fact that each block has been verified allows the previously used buffers to become available and the host write continues by writing the remaining blocks in 900 to the disk buffer memory 905. The buffer is only partially occupied, therefore additional operations requiring the buffer space can occur.

Although the preceding discussion covers the use of the buffer space for write commands, the stored control program executed by microprocessor 40 and the buffer management functions incorporated in buffer controller 24 provide for considerable flexibility to improve disk performance. The buffer memory space may be segmented to provide storage for both read and write commands concurrently. Microprocessor 40 may then enable the host to transmit a series of read and write commands and then process the commands in a sequence which is contrary to the order in which the commands were received. For example a read command, received after a write command, may be directed at an area of the disk located where the heads are currently positioned. Microprocessor 40 can elect to perform the read command before executing the write command thus avoiding an additional seek operation and the attendant mechanical latency. Additional performance improvements may be realized by reading or writing blocks out of sequence relative to their position within a track in order to minimize rotational latency. This intelligent management of the disk resources can significantly improve performance by reducing the burden of additional mechanical latency brought about by the arbitrary sequence of commands presented by the host.

Flow Chart Descriptions

FIGS. 4–7 in conjunction with FIG. 9 illustrate the method of the invention to verify data written on the disk media. The method is applied using routines executed in microprocessor 40 in conjunction with the controller assembly electronics 12 and the HDA 10.

Figure 4:
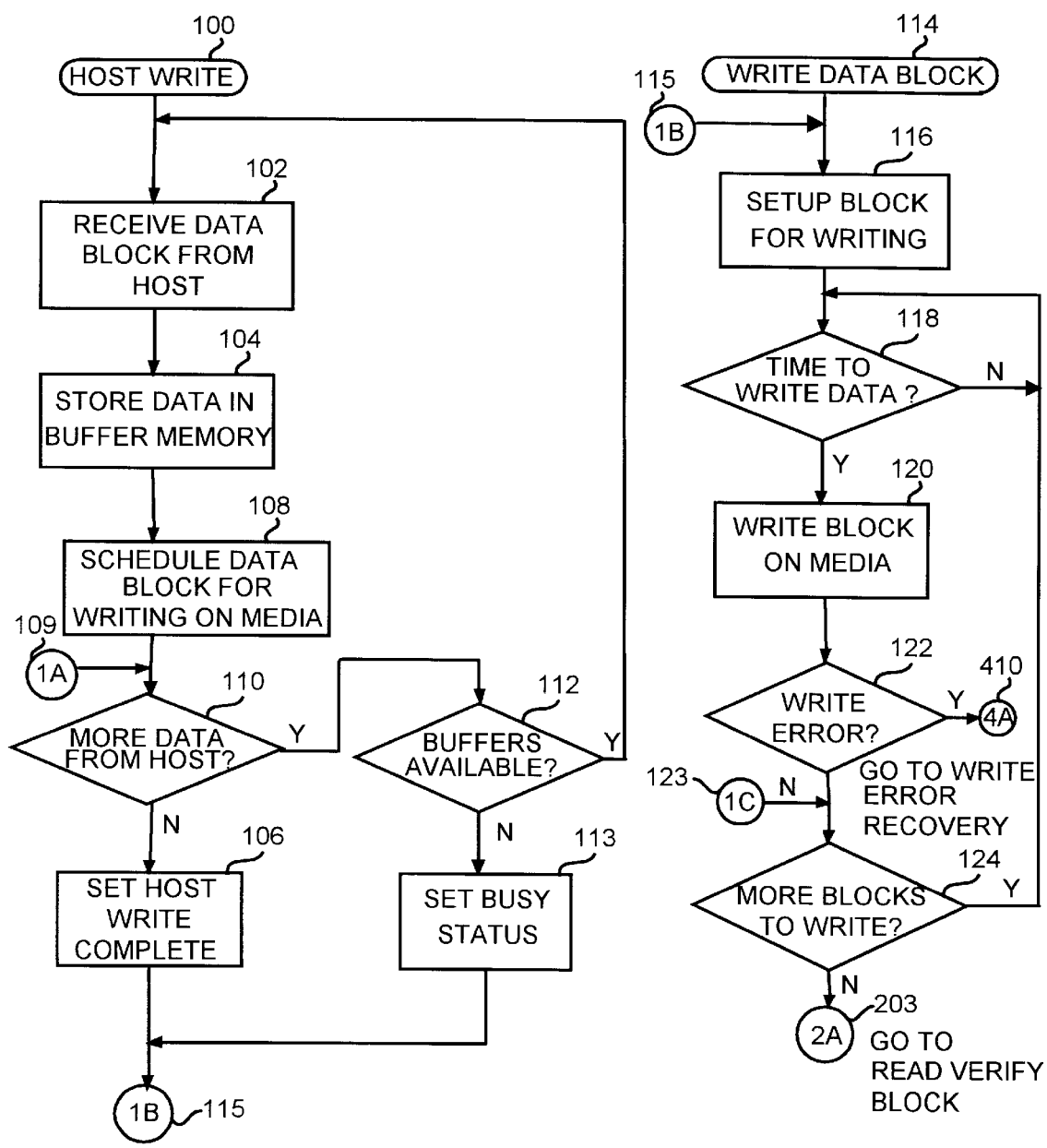
FIG. 4 is a flow chart illustrating the host write and data block write portion of the invention.

In FIG. 4, Host Write command routine 100 is initiated when a command from the host computer is received specifying that a sequence of data "blocks" 900 is to be written to the disk media. At step 102 the disk drive receives a block of host data. The data is stored in buffer memory at 104 and microprocessor 40 marks the space as "not available" in buffer status table 910. At step 108, the block is scheduled to be written on the media, indicated by the false "Written" status in buffer status table 910. A test is made at step 110 to see if more data is to be written from the host. If so, a check is made at 112 for available buffers. If buffer status table 910 indicates that buffers are available, the next block is received from the host at 102. If the disk drive has received all the promised data blocks 900 from the host, or if the disk is stalled for lack of buffers indicated by a No (N) result of step 112, "Busy" status is set at 113 to forestall further Host transfers and the method proceeds at step 115 to write the sequence of host data blocks. In the event that all data from the host is stored in the buffer, the disk drive acknowledges to the host that the blocks have been "written" at step 106. This process of declaring to the host that the blocks have been written after storage in buffer memory but prior to writing the data on the media is known in the art as "write caching." This enables a significant performance improvement through screening the host computer from disk mechanical operations.

The Write Data Block routine 114 starts with formation of the write block 920 in step 116 by inspecting buffer status table 910 for blocks with false "Written" status and at 118 determining whether the heads are currently positioned to write the data in the appropriate point on the media. This determination may involve delays for rotational latency or may require a switch in the channel electronics to a particular head or could require that the heads be repositioned radially on the media. When the appropriate area of the media is passing under the write head, the write data block is written on the media at 120. A test is made at 122 for a write error. In this context a write error is characterized as a condition detected by channel or servo electronics, in the course of writing, which prevented a successful write from occurring. This could involve a loss of track position precision, a head failure, or a detectable electronics failure. In this event an error recovery routine is executed at 410 and detailed in FIG. 7, later described.

If no write error is indicated, at 124 a test for more blocks to write is made to determine if the entire write block was not written or if additional write block segments have been scheduled. If required, the previously described steps are repeated to complete the writing of the block. Buffer status table 910 is updated to set "written" status for the write block. At the completion of the write data block operation, the Read-Verify routine 200 is entered.

Figure 5:
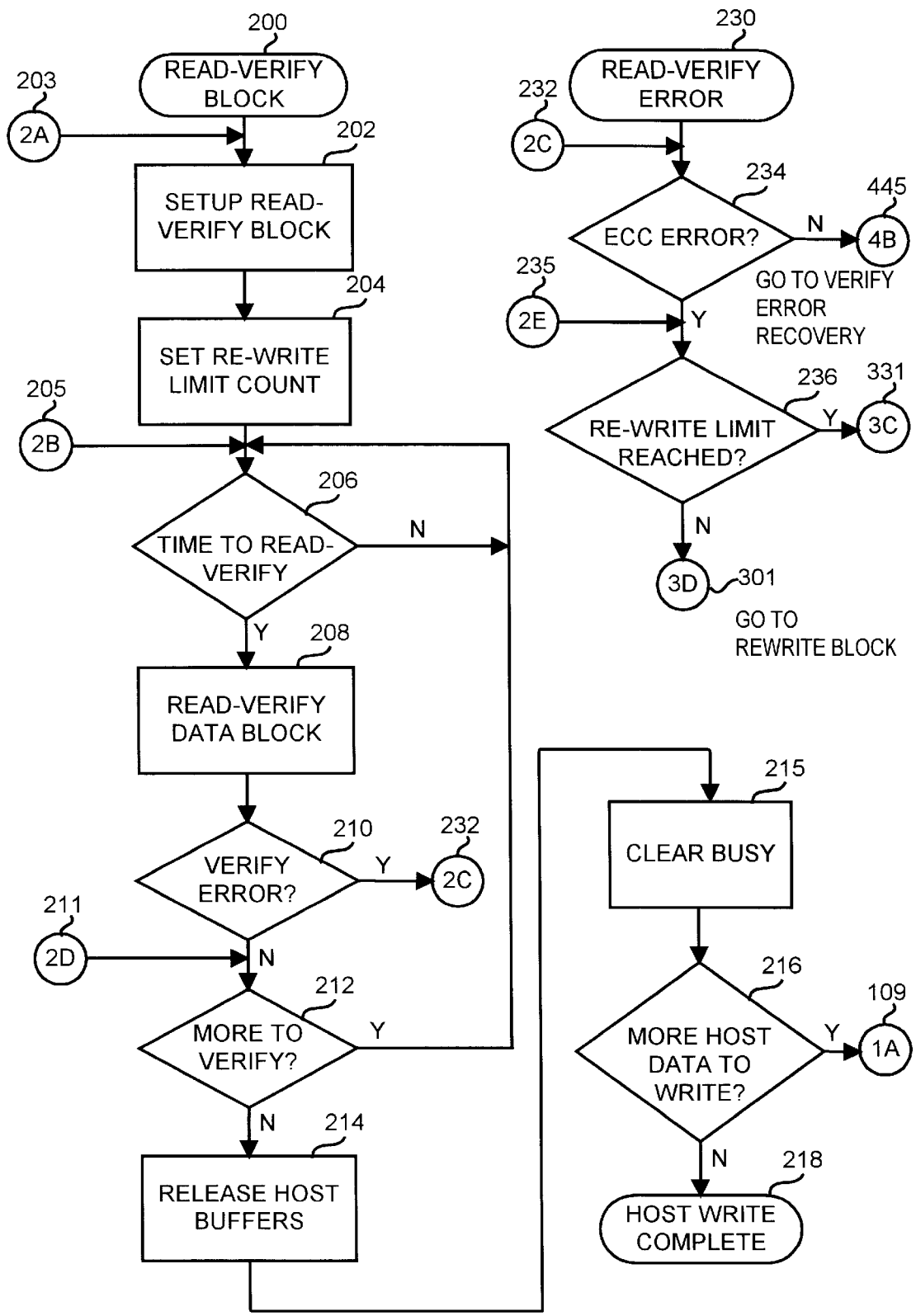
FIG. 5 is a flow chart illustrating the data read-verify portion of the invention.

Read-Verify block 200 starts in FIG. 5 with the scheduling of the read-verify block 930 at step 202. At 204 a re-write count limit is set which will determine how many times an attempt will be made to write the block in the specified area of the media if the Read-Verify operation indicates that the previous write was unsuccessful. At 206 a test for head position is made similar to that in the Write Data Block routine 118. When the media is positioned under the heads, the data is read and verified at 208 using the read-verify command of disk controller 28. No buffer space is used during this operation to store the data read from the media. At 210 disk controller 28 determines whether the error was correctable using the integrated on-the-fly error correction logic. If the data was correctable on-the-fly, a test for more verification operations is made at 212 and the process loops until the entire read-verification block is completed. Buffer status table 910 is updated to set "verified" status for the read-verify block 930. At 214 the buffers used to hold the data until verified are released for use in subsequent host operations by updating buffer status table 910 to set the buffer space "available." The "Busy" status is cleared at 215 to signal the Host that further operations are enabled and at 216 a test for more host data to write is made. If all data indicated by the host to be written has been written and verified, then the operation is complete at 218. If more data is pending, then the process continues at 109 in the host write routine.

If a verify error is indicated at step 210, the Read-Verify error routine 230 is entered at 232. A first test 234 is made for ECC errors. If an ECC error did not occur (N), then the error flag indicates that an invalid Read-Verify operation was executed (e.g. position error, or channel electronics operating outside normal limits) and the verification is indeterminate since the data sector was not properly read. In this event, a verify error recovery routine 440, illustrated in FIG. 7 and later described will be executed at 445. If a valid read-verify operation occurred (Y) indicating that the error was due to uncorrectable data, a test 236 is made to determine if the limit of attempted re-writes has been reached. If the re-write limit has been reached the block may be relocated to a spare area of the media in the relocate routine 330 discussed below. If the re-write limit has not been reached, the Re-write block routine 300 is invoked.

Figure 6:
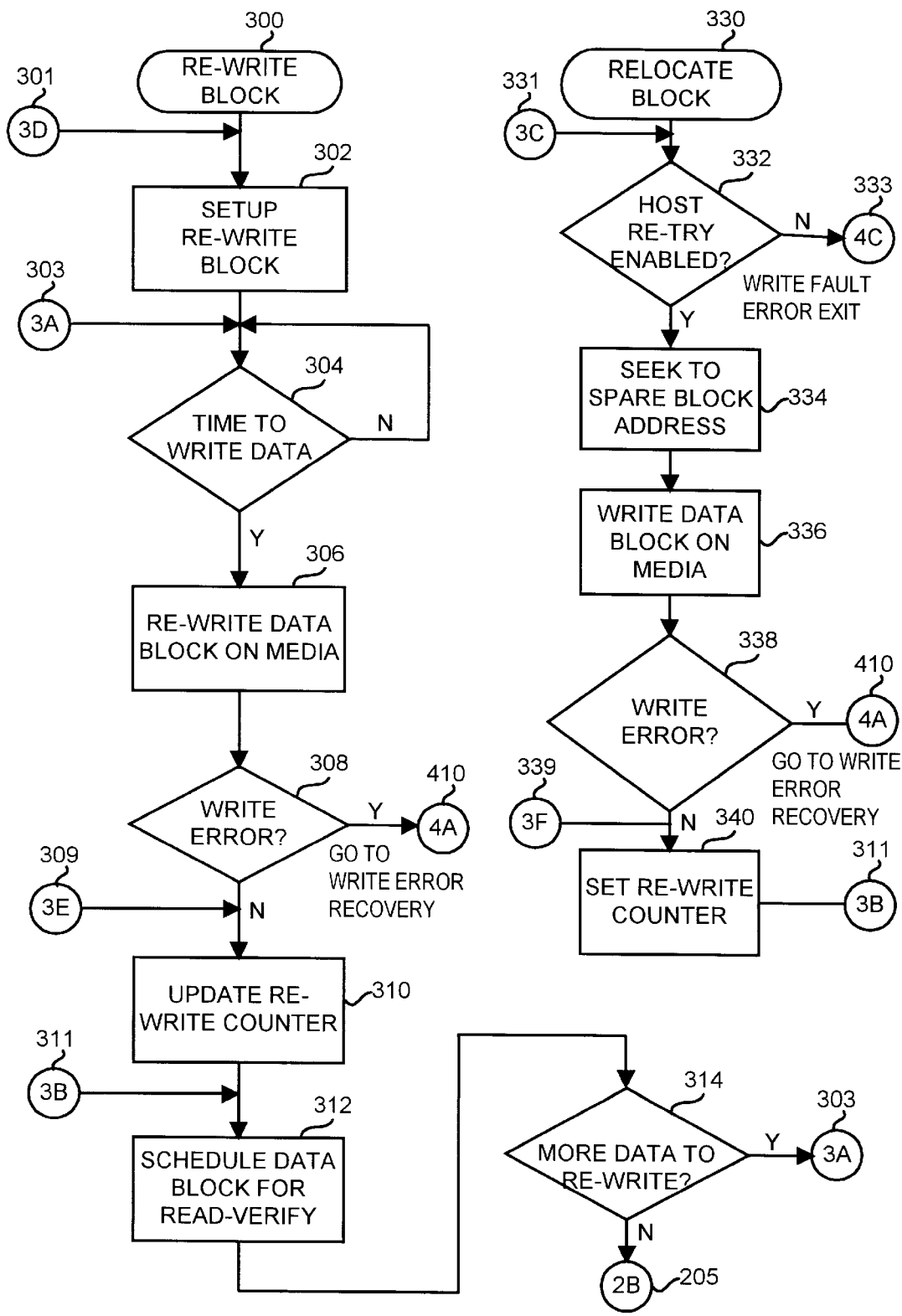
FIG. 6 is a flow chart illustrating the block re-write and relocation portions of the invention.

Re-write block 300 in FIG. 6 is similar to the write data block routine 114 previously discussed in that the block to written is scheduled at 302, buffer status table 910 is updated to reset the "written" condition, position is established at 304, the data is written at 306, presence of a write error is checked at 308 and write error recovery is invoked at 410 if write error is indicated. A significant aspect of scheduling the block to be re-written is that the entire block is re-written without an attempt to isolate an element smaller than the write block. This is done to compensate for potential marginality of data written in areas adjoining the actual location in error as illustrated in FIG. 8. The inventors have found experimentally that such apparently redundant writing achieves a significant reduction in transient error rates in the drive. If there is no write error, the re-write limit count is updated at 310 and the data block is scheduled for another read-verify operation at 312. At 314 a check for more data to re-write is made. If no more re-write operations are required at this time, the read-verify block routine is entered at 205. If there is more data to write, the re-write routine is continued at 303 until all scheduled data is re-written.

Relocate Block routine 330 is entered from the read-verify routine when the limit on re-writes in a specific area has been reached, indicating a media segment which is unsuitable for recording. In the preferred embodiment, a test 332 is made to see if the host has enabled re-trying write operations. If not, write fault routine 460 described below is entered at 462.

If relocation is enabled, the actuator and heads are moved to an area of the media which has been allocated for replacing (relocating) a defective area at 334. The relocation process is known in the art and is practiced by using local firmware management within the disk drive and without making the host computer aware of the relocation. The defective area is flagged in stored tables so that when a host makes reference to a defective area which has been relocated, the disk drive firmware substitutes the relocated segment without notifying the host of the substitution.

Relocation continues in a manner similar to the write data block routine 114 by writing the data block on the media 336, and checking for write error 338. If a write error is indicated the recovery routine is entered at 410. If no write error occurs, at 340 a re-write count limit is established for the newly relocated block and at 311 and 312 the data block is scheduled for a read-verify operation and the operation continues as in the re-write block and read-verify block routines previously described.

Figure 7:
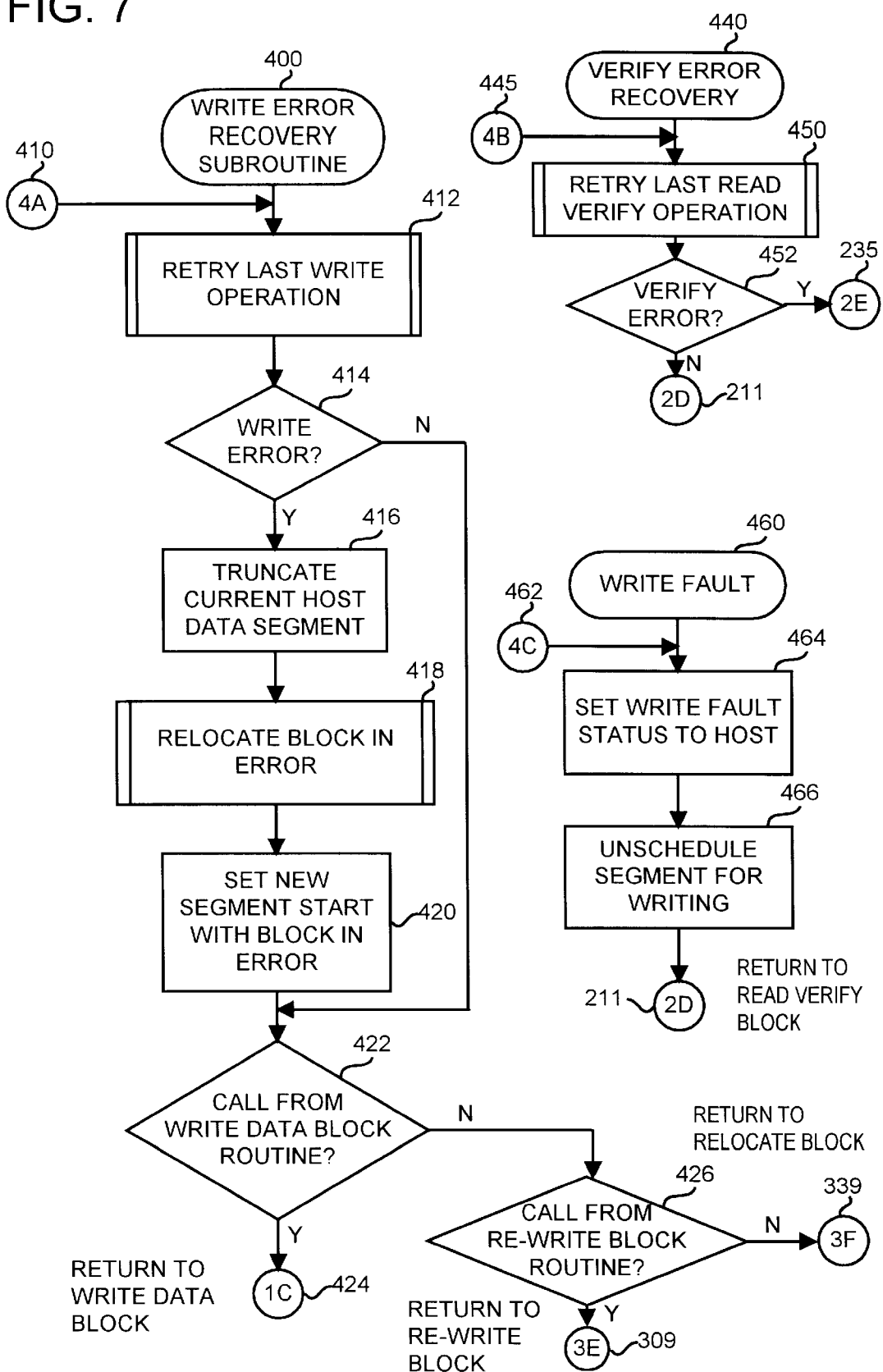
FIG. 7 is a flow chart illustrating error recovery subroutines

FIG. 7 illustrates error recovery routines for Write Error 400, Verify Error 440 and Write Fault 460. Write error recovery 400 may be invoked during the Write Data Block routine 114, the Re-write Block routine 300, or the Relocate Block routine 330. At 412 the operation in error is retried to compensate for a possible transient condition causing the error. A test of the retried operation is made at 414 to check for a write error. If the retried write operation was successful (N) i.e. no write error status, the routine invoking the retry is re-entered at 422 (Y), 426 (Y) or 426 (N). If an error is repeated 414 (Y) the current block to be written is truncated at 416. The truncation process divides a previously scheduled block into segments, allowing the portion (segment) of the block already written to be treated as a unit, and allowing subsequent segments to processed independently. This segmentation process is applied in other error recovery routines allowing a more efficient processing and release of buffer space during exception processing. The new segment is relocated at 418 using a procedure identical to the Relocate block routine 330. The new segment thus formed at 420 starts with the relocated block and is processed independently as described above. The routine exits as described above to the invoking process.

The verify error recovery routine 440 is entered at 445 from the read verify error routine. The operation is retried at 450. If no verify error occurs 452 (N), the read verify block routine is re-entered at 211. If an error recurs 452 (Y), the read verify routine is re-entered at 235 and the retry counter is incremented.

The Write Fault routine 460 is invoked when persistent write errors have caused the abandonment of a media segment and the Host has not enabled the disk drive to "re-try" i.e. relocate the write operation. The routine is entered at 462 and at 464 Write Fault status is set, informing the Host of an unrecoverable error in the block to be written. In an alternative embodiment, the drive firmware may choose to perform the relocation operation independently of the Host enabling re-try. At 466, the segment or block which has been unsuccessfully written is unscheduled and the Read-Verify Block routine is re-entered to test for further scheduled operations.

The invention described above thus provides a method executed within a magnetic disk drive and an apparatus in the disk drive for writing a block of data to disk drive media, performing a read operation to verify that the data has been written within correctable limits without storage of the data being read, and performing re-writes if necessary to reach correctable limits, ensuring a high degree of data integrity balanced with performance optimization.

We claim:

1. A method of verifying a write operation in a disk drive connected to a host computer, the drive including a rotating magnetic disk and a buffer memory, the method comprising:
   (a) receiving a block of data from the host computer and storing the block of data in the buffer memory as it is being received; and
   (b) while the block of data remains in the buffer memory:
      (1) writing a copy of the block of data to the disk;
      (2) writing redundancy data to the disk;
      (3) automatically reading the block of data and the redundancy data from the disk on a succeeding rotation;
      (4) while automatically reading the block of data and the redundancy data:
         (i) suppressing transfer to the buffer memory of the data automatically read; and
         (ii) testing whether the data automatically read are within correctable limits.

2. A method of verifying a write operation in a disk drive connected to a host computer, the drive including a rotating magnetic disk and a buffer memory, the method comprising:
   (a) receiving a block of data from the host computer and storing the block of data in a portion of the buffer memory as it is being received;
   (b) marking the portion of the buffer memory as being an unavailable portion;
   (c) while the block of data remains in the buffer memory:
      (1) writing a copy of the block of data to the disk;
      (2) writing redundancy data to the disk;
      (3) automatically reading the block of data and the redundancy data from the disk on a succeeding rotation;
      (4) while automatically reading the block of data and the redundancy data:
         (i) suppressing transfer to the buffer memory of the data automatically read; and
         (ii) testing whether the data automatically read are within correctable limits; and
      (5) if the data automatically read are within correctable limits, then marking the portion of the buffer memory as being an available portion.

3. A method of verifying a write operation in a disk drive connected to a host computer, the drive including a rotating magnetic disk and a buffer memory, the method comprising:
   (a) receiving a block of data from the host computer and storing the block of data in the buffer memory as it is being received; and
   (b) while the block of data remains in the buffer memory:
      (1) writing a copy of the block of data to the disk;
      (2) writing redundancy data to the disk;
      (3) automatically reading the block of data and the redundancy data from the disk;
         (4) while automatically reading the block of data and the redundancy data:
         (i) suppressing transfer to the buffer memory of the data automatically read; and
         (ii) testing whether the data automatically read are within correctable limits; and
      (5) if the data automatically read are outside correctable limits, repeating steps (1) to (4) until either testing of the data automatically read determines that the data automatically read are within correctable limits or the steps have been repeated a predetermined number of times; and
      (6) relocating the block of data when the predetermined number has been exceeded.

* * * * *